UNITED STATES PATENT OFFICE.

ANDREW BERTCH, OF LANSING, MICHIGAN.

IMPROVEMENT IN PROCESSES OF PRESERVING MEAT.

Specification forming part of Letters Patent No. 174,938, dated March 21, 1876; application filed February 18, 1876.

*To all whom it may concern:*

Be it known that I, ANDREW BERTCH, of Lansing, in the county of Ingham and State of Michigan, have invented certain new and useful Improvements in Prepared Meat; and I do hereby declare the following to be a full, clear, and exact description of the invention, such as will enable others skilled in the art to which it pertains to make and use it.

My invention has reference to the preservation of meats, so that they may be securely carried through long seasons of warm weather, and remain in an unaffected condition throughout such heated temperatures.

Heretofore, meats prepared after varying manners have been sacked and thrown upon the market, but it has been found that there was a need for improved casings for same, which in themselves should be impervious to the action of the atmosphere, as well as a different process for reducing the meat to a proper condition for sacking.

My invention consists in the following steps and processes, as hereinafter described and claimed: I provide bags of convenient shape, and from material as may be suitable, and then thoroughly immerse same in a solution heated to a moderate degree of temperature, and which consists of about the following parts and proportions: One-half gallon of molasses to one pound of salt diluted in a pint of water. After saturation, the sacking is taken out and dried, when it will be discovered that the above compound has served to give to the material a slight incrustation, has filled the interstices between the fibers, and also has rendered the same antagonistic to the oxidation of its containing matter. My second step is to prepare the meat for filling the bags, which I do by first trimming off all the fat which can be gotten at, since meat is far less likely to become hollow during time and handling in the sacking by such a course than otherwise, and then treating with a diluted admixture in the proportion of three-quarters of a pound of saltpeter to a quart of sirup for each one hundred pounds of meat. In this bath the meat should lie for about twenty-four hours, after which it should be passed through a chopping-machine or other means by which it shall be disintegrated and thoroughly reduced to a pulp or mash. When digested as fine as possible, it is ready to be packed into its sacking, which should be done by as tight and close a compressment as can be obtained. It might be well to again saturate the bags before packing, though I do not hold it as necessary; but when filled and fastened at their mouth, the entire product should be pickled for from twenty-four to thirty-six hours in a brine of twenty gallons of water to a quart of molasses, enough salt having first been added thereto to float an egg on its surface. When taken from the brine, subject it to the action of green-wood smoke, as is usually done, and for a suitable time, when it is ready for the market.

By such a process an article is prepared which can withstand great exposure to all tendency toward oxidation, especially in the preparation of pork, since the ham may be eaten raw or cooked, and suffers no deterioration by lapse of time, relatively speaking.

Having thus fully described my invention, what I claim as new, and desire to secure by Letters Patent, is—

A process of preserving meats, the same consisting in treating with a dilute mixture of sirup and saltpeter, reducing, and then compressing into sacking previously saturated in a solution of salt and molasses, the whole being then subjected to the action of a pickle, and subsequently smoked, all as hereinafter set forth.

In testimony that I claim the foregoing I have hereunto set my hand this 15th day of February, 1876.

ANDREW BERTCH.

Witnesses:
FRANK D. WELLER,
EUGENE P. SHINE.